United States Patent [19]

Foote

[11] Patent Number: 4,653,041

[45] Date of Patent: Mar. 24, 1987

[54] RECORD DISK DRIVE

[75] Inventor: James C. Foote, York, N.Y.

[73] Assignee: Eastman Kodak Company, Rochester, N.Y.

[21] Appl. No.: 802,396

[22] Filed: Nov. 27, 1985

[51] Int. Cl.$^4$ .................. G11B 25/04; F16D 3/14; F16D 11/02

[52] U.S. Cl. .................... 369/266; 192/56 C; 369/262; 464/40

[58] Field of Search ............. 369/262, 266, 258, 270; 192/56 C; 464/40, 57

[56] References Cited

U.S. PATENT DOCUMENTS

| | | | |
|---|---|---|---|
| 677,872 | 7/1901 | Locke | 464/40 |
| 1,046,995 | 12/1912 | Deiller | 192/41 S |
| 1,690,267 | 11/1928 | Barrans et al. | 369/266 |
| 1,940,880 | 12/1933 | Pittet | 192/56 C |
| 2,505,329 | 4/1950 | Jacobson | 192/41 S |
| 2,550,826 | 5/1951 | Kuhlik | 369/258 |
| 2,688,389 | 9/1954 | Wittel et al. | 192/41 S |
| 3,335,835 | 8/1967 | Conlon | 192/56 C |
| 3,618,730 | 11/1971 | Mould | 192/56 C |
| 3,832,866 | 9/1974 | Thomson | 192/56 C |
| 3,893,554 | 7/1975 | Wason | 464/40 |

FOREIGN PATENT DOCUMENTS

| | | | |
|---|---|---|---|
| 21657 | of 1907 | United Kingdom | 369/266 |
| 19667 | of 1912 | United Kingdom | 369/266 |
| 322884 | 12/1929 | United Kingdom | 369/266 |

*Primary Examiner*—Steven L. Stephan
*Attorney, Agent, or Firm*—Steve W. Gremban

[57] ABSTRACT

A record disk drive is disclosed which includes a rotating drive shaft and means for receiving a record disk. A torque-transmitting helical spring clutch drivingly interconnects the shaft and the disk. The clutch includes a first coil portion which is in driven engagement with the shaft upon rotation of the shaft in a certain direction relative to the receive disk. A second coil portion of the clutch is continuous with, but eccentric to, the first coil portion. Abutment means on the second coil portion are normally in driving engagement with a received disk, but means are provided for shifting the second coil portion toward a position concentric with the first coil portion, whereupon the abutment means moves out of engagement with the received disk, and thereby disengages the clutch. The shifting means may be a cylindrical sleeve which is axially slidable over the helical spring clutch to move the second coil portion toward its concentric position relative to the first coil portion. In such case, the axial end of the sleeve may have an internal parabolic cross section. Alternatively, the shifting means may be a cylindrical sleeve axially slidable within the helical spring clutch; whereupon the sleeve may have an external paraboloid cross-section. In order to gain stability, the helical spring clutch may be formed of coils having rectangular cross-sectional shapes to inhibit telescoping. If a torque-limiting feature is desired, the first coil portion of the clutch may be wound upon the drive shaft in a direction such that rotation of the drive shaft tends to unwind the first coil portion, to at least partially release the gripping pressure of the first coil portion on the drive shaft.

7 Claims, 6 Drawing Figures

FIG. 5
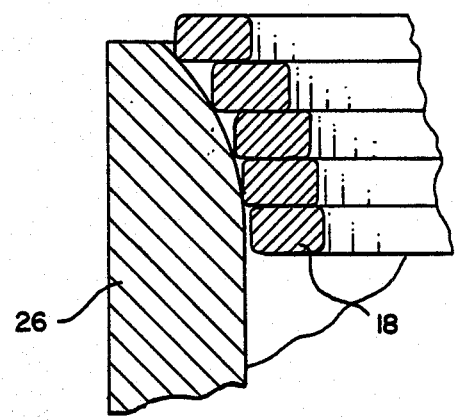
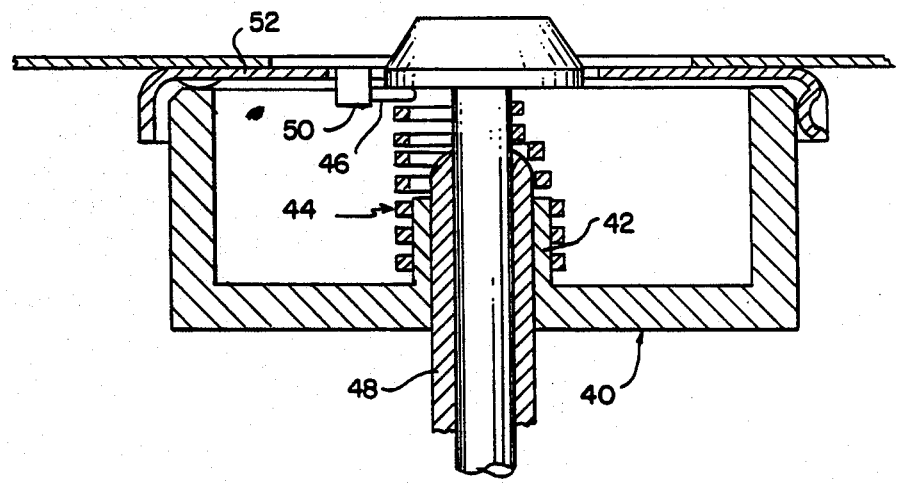
FIG. 6

RECORD DISK DRIVE

BACKGROUND OF THE INVENTION

This invention relates to clutch mechanisms, and more particularly to such mechanisms designed primarily for record disk drives, wherein disks can be disengaged from a drive shaft while the drive shaft continues to turn.

DESCRIPTION OF THE PRIOR ART

Helical spring type clutches are commonly used as torque-transmitting mechanisms between coaxial drive and driven shafts, and often are arranged to prevent transmission of torque beyond a predetermined maximum. U.S. Pat. Nos. 3,618,730 and 3,893,554, show examples of such torque-limiting clutches.

While such spring clutches are being extensively used, they are not entirely satisfactory for record disk drives because there is no ready means to disengage the clutch while the drive shaft continues to turn.

SUMMARY OF THE INVENTION

The present invention constitutes an improvement over prior art devices in that a relatively simple, inexpensive, yet reliable torque-limiting clutch is provided wherein a record disk and a drive shaft can be disengaged while the shaft continues to turn, without any axial movement of the disk. These improvements are achieved without sacrificing precise positioning of the record disk relative to the drive shaft.

A record disk drive in accordance with the present invention includes a rotating drive shaft and means for receiving a record disk. A torque-transmitting, helical spring clutch drivingly interconnects the shaft and the disk. The clutch includes a first coil portion which is in driven engagement with the shaft upon rotation of the shaft in a certain direction relative to the received disk. A second coil portion of the clutch is continuous with, but eccentric to, the first coil portion. Abutment means on the second coil portion are normally in driving engagement with a received disk, but means are provided for shifting the second coil portion toward a position concentric with the first coil portion, whereupon the abutment means moves out of engagement with the received disk, and thereby disengages the clutch.

The shifting means may be a cylindrical sleeve which is axially slidable over the helical spring clutch to move the second coil portion toward its concentric position relative to the first coil portion. In such case, the axial end of the sleeve may have an internal parabolic cross-section. Alternatively, the shifting means may be a cylindrical sleeve axially slidable within the helical spring clutch; whereupon the sleeve may have an external parabolic cross-section.

In order to gain stability, the helical spring clutch may be formed of coils having rectangular cross-sectional shapes to inhibit telescoping. If a torque-limiting feature is desired, the first coil portion of the clutch may be wound upon the drive shaft in a direction such that rotation of the drive shaft tends to unwind the first coil portion, to at least partially release the gripping pressure of the first coil portion on the drive shaft.

The invention and its objects and advantages will become more apparent in the detailed description of the preferred embodiments presented below.

BRIEF DESCRIPTION OF THE DRAWINGS

The description of preferred embodiments refers to the attached drawings wherein:

FIG. 5 is an enlarged detailed view of a portion of the disk drive of FIG. 1; and FIG. 6 is a view similar to FIG. 1 showing an alternative embodiment of the present invention.

DETAILED DESCRIPTION OF THE PREFERRED EMBODIMENTS

Because disk drives are well known, the present description will be directed in particular to elements forming part of, or cooperating more directly with, apparatus in accordance with the present invention. It is to be understood that record disk and disk drive elements not specifically shown or described may take various forms well known to those skilled in the art.

Figure 1:
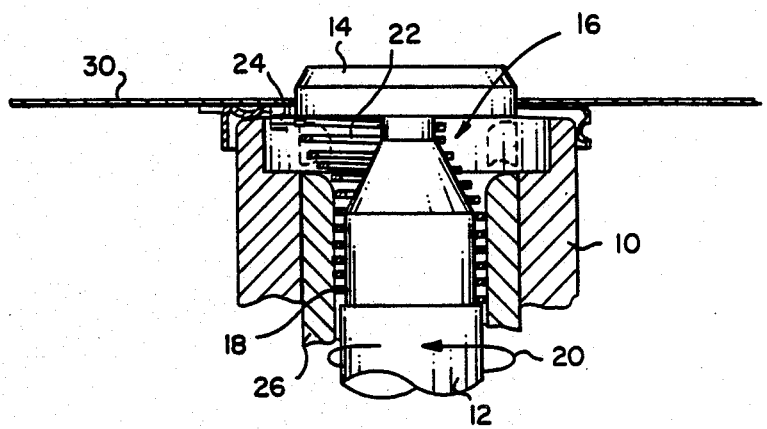
FIG. 1 is a side view, partially in section of a disk drive mechanism in accordance with the present invention and further showing a received record disk.

Referring to FIG. 1, a portion of a disk drive in accordance with a preferred embodiment of the present invention is shown wherein the record disk drive includes an annular disk seating member 10 and a rotating drive shaft 12. A spindle 14 is attached to the top of the drive shaft.

Figure 2:
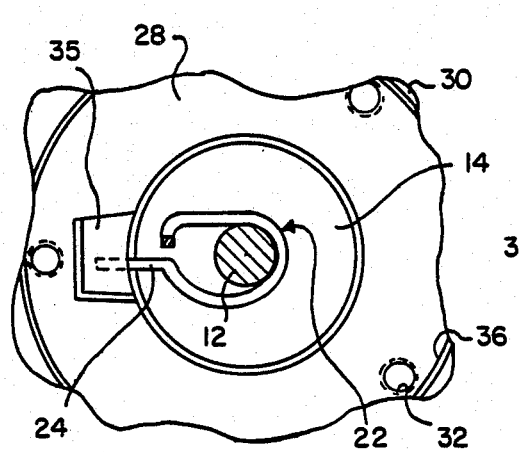
FIG. 2 is a bottom view partially in section of the drive mechanism and disk of FIG. 1.

A torque-transmitting, helical spring clutch 16 encircles the top end of shaft 12. A first coil portion 18 of the spring clutch is wound about shaft 12 in a direction such that rotation of the shaft in the direction of arrow 20 would tend to loosen the coils. A second coil portion 22 of spring clutch 16 is continuous with, but eccentric to, the first coil portion. As best seen in FIG. 2, the second coil portion has a tail 24 which extends radially outwardly relative to the axis of shaft 12.

A cylindrical sleeve 26 is axially movable between drive shaft 12 and disk seating member 10 on the outside of spring clutch 16. The sleeve is normally positioned as shown in full line in FIG. 1, but can be moved upwardly to the phantom line position of that figure.

Figure 3:
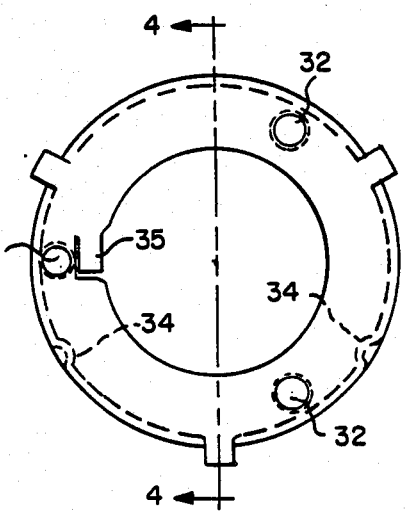
FIG. 3 is a top plan view of a hub of a record disk usable with a disk drive in accordance with FIG. 1.
Figure 4:
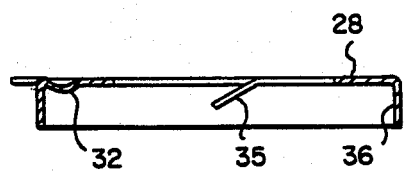
FIG. 4 is a sectional view taken through line 4—4 of FIG. 3.

Referring to FIGS. 2-4, details of a record disk which cooperate with the disk drive of the present invention will be discussed. The record disk includes a hub 28 at the center of a circular record medium 30. Three seating pads 32 define a plane, and rest against the upper surface of disk seating member 10 (FIG. 1) when the record disk is mounted on the disk drive. A pair of radial seating pads 34 project inwardly from cylindrical surface 36 of hub 28. These pads rest against the outer annular surface of seating member 10 to align the center of the hub with the axis of shaft 12. The hub is moved laterally until these pads contact seating member 10 by pressure against a depending lug 35 from tail 24 of spring clutch 16 as shown in FIG. 2.

In operation, a record disk can be loaded onto the drive shaft while the drive shaft is already rotating. When this occurs, tail 24 of spring clutch 16 engages the depending lug 35 on hub 28 of the record disk. Since the drive shaft is already rotating, spring clutch 16 will be rotating therewith. The low-mass spring begins to unwind when tail 24 contacts lug 35, thus cushioning the shock of engagement. As the spring unwinds, it tends to relax its grip on the outer perimeter of drive shaft 12, to at least partially release the gripping pressure of first coil portion 18 on the drive shaft, and to thereby allow rotational slippage between the drive shaft and the disk. The disk is thus quickly but smoothly brought up to speed, limiting the applied torque to a predetermined value.

When the record disk is to be removed, sleeve 26 is moved from its lowered, full-line position of FIG. 1 to its phantom line position in that figure. Raising the sleeve forces the second, eccentric coil portion of the spring cluch toward a concentric position, thereby retracting tail 24 radially inwardly and causing the tail to disengage from lug 35 on the record disk hub. The record disk is then free to decelerate, and may be removed.

It was found during the design and testing of the record disk drive that the second, eccentric portion of spring clutch 16 tended to telescope within itself when sleeve 26 is advanced from its full to its phantom line positions as shown in FIG. 1. I have discovered that the telescoping problem is overcome by using rectangular cross-section wire as shown in FIG. 5 rather than circular cross-section wire. Successive coils of the spring are then able to gain stability from each other as the coils move sideways while the sleeve was advanced. Such rectangular cross-section wire is readily available commercially.

Another problem encountered during development related to the lateral motion of the coils of the second, eccentric portion of spring clutch 16 when sleeve 26 is advanced if the sleeve tip is conically-shaped. Sideways movement of any given spring coil also causes lesser movement in adjacent spring coils. Consequently, a conically-shaped sleeve tip cross-section would not provide the desired sharing of load among the spring coils as the sleeve was advanced, and result in a rough, binding action. Analysis of the side loading on a spring shows that a parabolic profile provides theoretically uniform sharing of the load, as shown in FIG. 5. The resultant action with such a sleeve tip design is smooth and avoids the rough and binding characteristic action of a conically-shaped tip.

A second embodiment of the present invention is shown in FIG. 6, wherein a rotating member 40 has a shaft portion 42 about which a helical spring clutch 44 is wound. The first, lower coil portion of the spring clutch is wound about shaft 42 in a direction such that rotation of the shaft would tend to loosen the coils. The second, upper coil portion of spring clutch 44 is continuous with, but eccentric to, the first coil portion. The second coil portion has a tail 46 which extends radially outwardly relative to the axis of drive shaft 42. A cylindrical sleeve 48 is axially suitable within the helical spring clutch. Raising the sleeve forces the second, eccentric coil portion of the spring clutch toward a concentric position to retract tail 46 radially inwardly, causing it to disengage from a lug 50 on the hub 52 of a record disk.

As in the case of the first embodiment, the cross-sectional shape of the wire of spring clutch 44 is preferably rectangular to inhibit telescoping. Further, the upper end of sleeve 40 preferably has an external paraboloid cross-section to provide uniform sharing of the load among the spring coils as the sleeve is advanced.

The invention has been described in detail with particular reference to certain preferred embodiments thereof, but it will be understood that variations and modifications can be effected within the spirit and scope of the invention.

I claim:

1. A record disk drive comprising
   A. a rotating drive shaft;
   B. means for receiving a record disk;
   C. a torque-transmitting helical spring clutch having
      (1) a first coil portion in driven engagement with the shaft upon rotation of the shaft in at least a certain direction relative to a received disk,
      (2) a second coil portion continuous with, but eccentric to, said first coil portion, and
      (3) abutment means on said second coil portion in driving engagement with a received disk; and
   D. means for shifting said second coil portion toward a position concentric with said first coil portion, whereupon said abutment means moves out of engagement with a received disk.

2. A record disk drive as defined in claim 1 wherein said shifting means is a cylindrical sleeve axially slidable over the helical spring clutch to force said second coil portion toward its concentric position with said first coil portion.

3. A record disk drive as defined in claim 2 wherein the axial end of the sleeve has an internal parabolic cross section.

4. A record disk drive as defined in claim 1 wherein said shifting means is a cylindrical sleeve axially slidable within the helical spring clutch.

5. A record disk drive as defined in claim 4 wherein the axial end of the sleeve has an external parabolic cross section.

6. A record disk drive as defined in claim 1 wherein said helical spring clutch is formed of coils having rectangular cross-sectional shapes to inhibit telescoping, whereby successive coils are able to gain stability from each other as the coils move radially.

7. A record disk drive as defined in claim 1 wherein said first coil portion encircles the drive shaft in gripping contact and in a direction such that rotation of the drive shaft in said certain direction relative to the disk tends to unwind the first coil portion to at least partially release the gripping pressure of said first coil portion on the drive shaft, thereby allowing rotational slippage between said drive shaft and the disk.

* * * * *